United States Patent [19]
Sasaki et al.

[11] Patent Number: 5,137,496
[45] Date of Patent: * Aug. 11, 1992

[54] SLIDING UNIVERSAL JOINT HAVING A HOLDER INCLINATION RESTRICTION FLANGE

[75] Inventors: Akira Sasaki; Seiji Esaki; Yasushi Hashimoto; Shigeo Kurita, all of Wako, Japan

[73] Assignee: Honda Giken Kabushiki Kaisha, Tokyo, Japan

[*] Notice: The portion of the term of this patent subsequent to Jan. 2, 2007 has been disclaimed.

[21] Appl. No.: 700,057

[22] Filed: May 8, 1991

Related U.S. Application Data

[63] Continuation of Ser. No. 465,574, Jan. 18, 1990, abandoned, which is a continuation of Ser. No. 212,640, Jun. 28, 1988, abandoned.

[30] Foreign Application Priority Data

Jul. 1, 1987 [JP] Japan .................. 62-101634[U]
Jul. 1, 1987 [JP] Japan .................. 62-164950

[51] Int. Cl.$^5$ ............................................. F16D 3/205
[52] U.S. Cl. ........................................ 464/111; 464/123; 464/905

[58] Field of Search ............... 464/111, 123, 129, 132, 464/905

[56] References Cited

U.S. PATENT DOCUMENTS

| | | | |
|---|---|---|---|
| 4,192,154 | 3/1980 | Nakamura et al. | 464/111 |
| 4,578,048 | 3/1986 | Hirai et al. | 464/111 |
| 4,891,035 | 1/1990 | Sasaki et al. | 464/111 |
| 4,954,119 | 9/1990 | Sasaki et al. | 464/111 |
| 4,971,595 | 11/1990 | Sasaki et al. | 464/111 |

FOREIGN PATENT DOCUMENTS

| | | | |
|---|---|---|---|
| 152740 | 12/1979 | Japan | 464/124 |
| 56-47413 | 11/1981 | Japan | . |
| 57-13211 | 3/1982 | Japan | . |
| 62-25098 | 2/1987 | Japan | . |

Primary Examiner—Daniel P. Stodola
Assistant Examiner—William G. Battista, Jr.
Attorney, Agent, or Firm—Armstrong, Nikaido, Marmelstein, Kubovcik & Murray

[57] ABSTRACT

A restriction flange formed integrally on one end of each cylindrical holder in a sliding universal joint abuts the bottom surface of the respective transmitting groove to prevent inclination of the holder relative to a center axis of the outer member of the joint.

3 Claims, 4 Drawing Sheets

SLIDING UNIVERSAL JOINT HAVING A HOLDER INCLINATION RESTRICTION FLANGE

This application is a continuation of application Ser. No. 465,574 filed Jan. 18, 1990, now abandoned, which is a continuation of Ser. No. 212,640 filed Jun. 28, 1988, now abandoned.

BACKGROUND OF THE INVENTION

The present invention relates to a sliding universal joint to be mounted at a bending portion of a bendable drive axle in an automobile, for example. More particularly the invention is directed to an improvement in a joint including a cylindrical outer member connected to one transmitting shaft and having an inner periphery formed with a plurality of transmitting grooves arranged circumferentially equally spaced from each other and extending axially, an inner member connected to another transmitting shaft and having a plurality of trunnions radially extending to project into the transmitting grooves, an inner roller slidably engaged with an outer periphery of each trunnion, a holder relatively oscillatably engaging with an outer periphery of each inner roller, and an outer roller rotatably engaging with an outer periphery of each holder and engaged with the respective transmitting groove.

This type of universal joint is known as disclosed in Japanese Patent Publication No. 57-13211.

In the conventional joint, when both transmitting shafts are bent relative to each other during transmission of torque, the outer roller is reciprocatingly rolled in the transmitting groove permitting inclination of the trunnion. The inclination of the trunnion follows the inclination of the outer roller, causing an increase in rolling resistance of the outer roller and thus generating vibration.

The present invention has been achieved to solve the above problem, and it is an object of the invention to provide a sliding universal joint which may reliably prevent the outer roller being inclined in association with the inclination of the trunnion.

According to the present invention, there is provided in a sliding universal joint, the improvement comprising a restriction flange integrally formed with the holder, said restriction flange abutting against a bottom surface of the transmitting groove and restricting inclination of the holder.

With this arrangement, during rotation of the universal joint, restriction flange integrally formed with the holder is urged against the bottom surface of the transmitting groove by centrifugal force, thereby reliably maintaining an abutting condition of the flange against the bottom surface of the transmitting groove. Accordingly, even when the trunnion is inclined, the holder is reliably prevented from inclining because of the abutment of the restriction flange against the bottom surface of the transmitting groove. Accordingly, the outer roller supported by the holder is also prevented from inclining and can be smoothly rolled on the inner surface of the transmitting groove.

BRIEF EXPLANATION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

There will now be described the preferred embodiments of the present invention with reference to the drawings.

Figure 1:
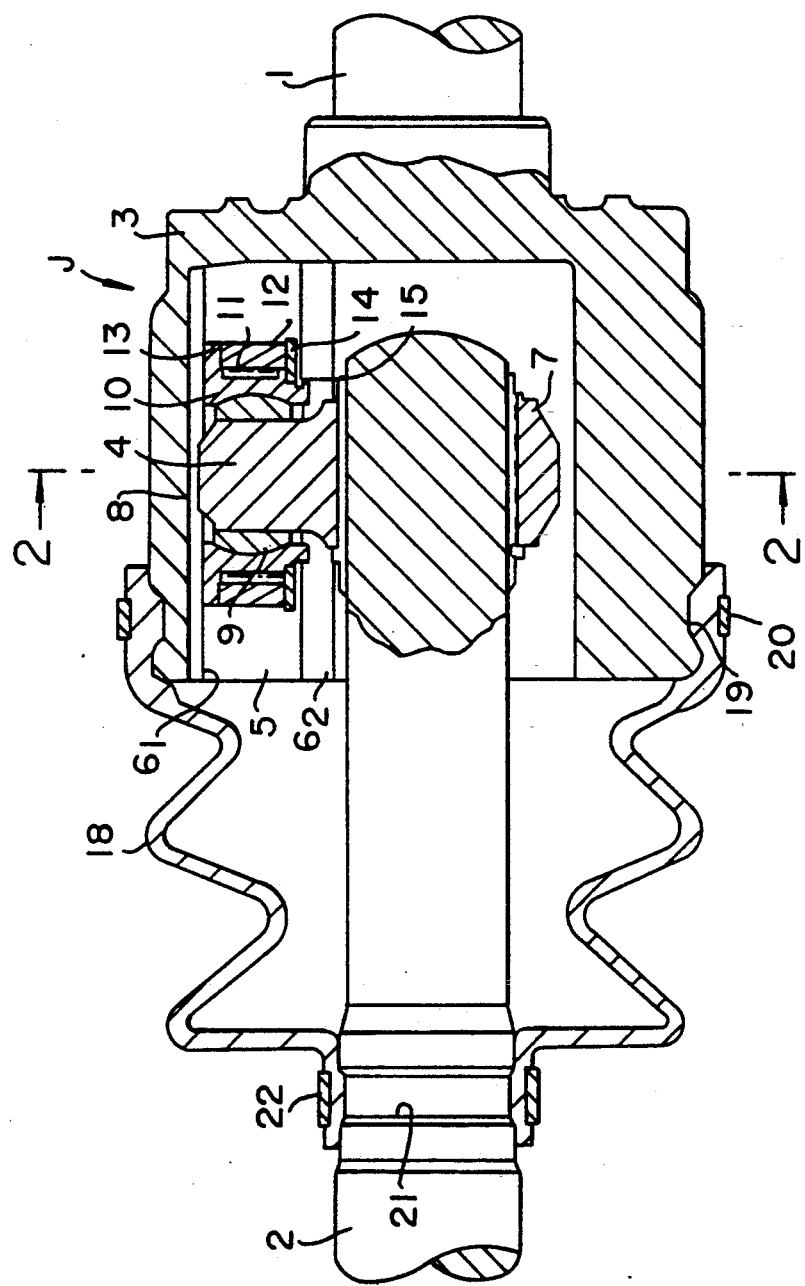
FIG. 1 is a vertical sectional view of the first preferred embodiment of the sliding universal joint according to the present invention.
Figure 2:
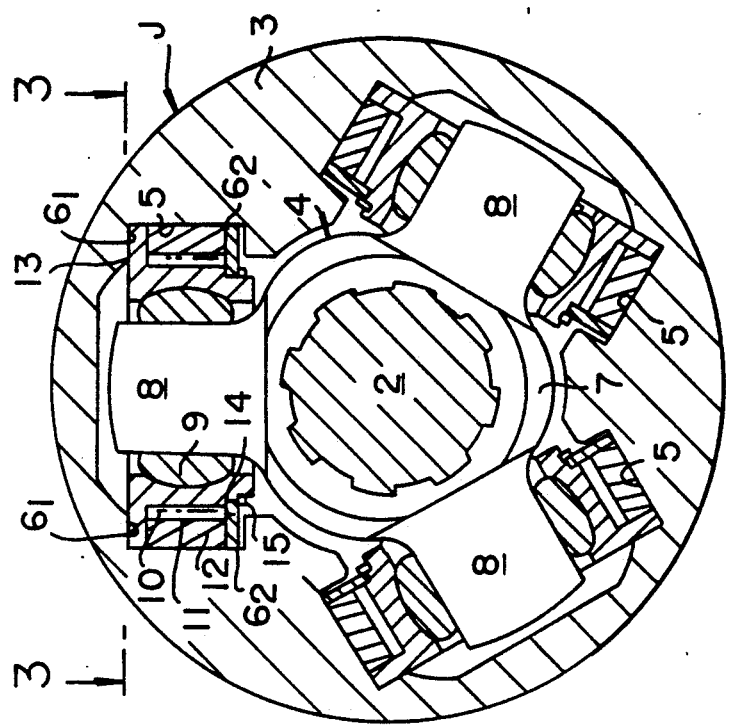
FIG. 2 is an enlarged cross-section taken along the line II—II in FIG. 1.

Referring first to FIGS. 1 and 2, two transmitting shafts 1 and 2 are connected to each other through a sliding universal joint J of the present invention. The joint J primarily comprises a cylindrical outer member 3 integrally formed with an end portion of the transmitting shaft 1 which outer member 3 is open at one end thereof, and an inner member 4 fixed to an end portion of the transmitting shaft 2 and received in the outer member 3. The outer member 3 is formed on its inner peripheral surface with three axially extending transmitting grooves 5 circumferentially equally spaced from each other. Each groove 5 is provided with a pair of first rail portions $6_1$ at both side portions of a bottom surface of the groove 5 and with a pair of second rail portions $6_2$ opposed to the first rail portions $6_1$.

The inner member 4 fixed to the transmitting shaft 2 is formed with a boss 7. The boss 7 is integrally formed on its outer peripheral surface with three trunnions 8 projecting into the three transmitting grooves 5.

An inner roller 9 having a spherical outer periphery is slidably engaged with an outer periphery of each trunnion 8 in such a manner that a center of the inner roller 9 lies on an axis of the trunnion 8. A holder 10 is relatively oscillatably engaged with the spherical outer periphery of the inner roller 9. A cylindrical outer roller 12 is rotatably supported through a needle bearing 11 on the outer periphery of the holder 10, and is rollingly engaged with the inner surface of the transmitting groove 5.

The holder 10 is integrally formed at its outer end with a restriction flange 13 slidably abutting against the first rail portions $6_1$ of the transmitting groove 5. A presser plate 14 is mounted at an inner end portion of the holder 10 by a circlip 15. The presser plate 14 cooperates with the restriction flange 13 to restrict axial movement of the outer roller 12. The presser plate 14 is arranged in opposed relationship to the second rail portions $6_2$ of the transmitting groove 5.

Figure 3:
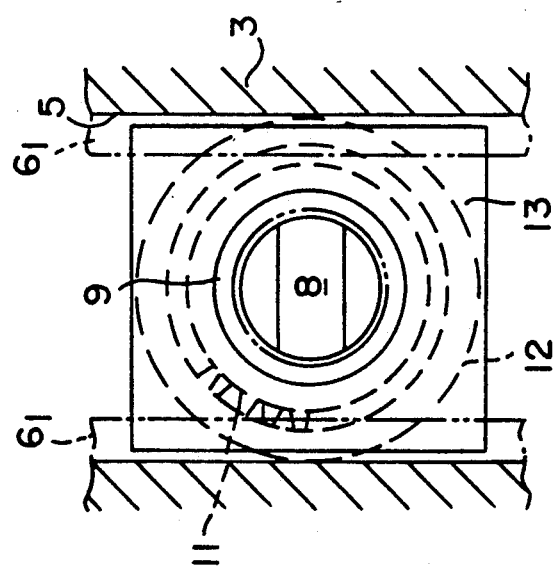
FIG. 3 is a cross-section taken along the line III—III in FIG. 2.

As shown in FIG. 3, the restriction flange 13 is formed in a rectangular shape such that opposite two sides of the flange 13 are parallel to the longitudinal direction of the transmitting groove 5. Further, the restriction flange 13 has a side length along a transverse direction of the transmitting groove 5 slightly smaller than an outer diameter of the outer roller 12, and has the other side length along the longitudinal direction of the transmitting groove 5 greater than the outer diameter of the outer roller 12. With this arrangement, the restriction flange 13 abuts against the first rail portions 6₁ to effectively restrict inclination of the holder 1 without hindering the rolling motion of the outer roller 12 on the inner side surfaces of the transmitting groove 5.

The presser plate 14 may be formed in a rectangular shape similar to the restriction flange 13, or it may be formed in a circular shape. In the latter case, the outer diameter of the presser plate 14 is made smaller than the outer diameter of the outer roller 12, so as not to hinder the rolling motion of the outer roller 12.

Referring back to FIG. 1, a flexible boot 18 is provided between the outer member 3 and the transmitting shaft 2 to cover the front opening of the outer member 3. A rear end of the flexible boot 18 is engaged with an outer circumferential groove 19 of the outer member 3, and is tightened by a band 20. A front end of the flexible boot 18 is engaged with an outer circumferential groove 21 of the transmitting shaft 2, and is tightened by a band 22.

In operation, when torque is applied to the transmitting shaft 1, for example, the torque is transmitted from the outer member 3 to the inner member 4, that is, from one side surface of the transmitting groove 5 through the outer roller 12, the holder 10 and the inner roller 9 to the trunnion 8 and the boss 7, and is finally transmitted to the transmitting shaft 2.

During such transmission of the torque, the restriction flange 13 integrally formed with the holder 10 is urged directly against the first rail portions 61 of the transmitting groove 5 by centrifugal force of the holder 10, and such abutting condition of the restriction flange 13 against the rail portions 6₁ is reliably maintained. Accordingly, even when the trunnion 8 is inclined in the transmitting groove 5 in association with the bending operation of the transmitting shafts 1 and 2, the holder 10 is reliably prevented from being inclined owing to the abutment of the restriction flange 13 against the first rail portions 6₁. Accordingly, the outer roller 12 supported on the holder 10 is also prevented from being inclined and is allowed to smoothly roll on the side surfaces of the transmitting groove 5.

On the other hand, when the trunnion 8 is inclined, the inner roller 9 is oscillated relative to the holder 10 as slightly sliding on the trunnion 8, so that an inclination moment to be applied to the holder 10 may be made small.

During low-speed rotation of the joint J, the centrifugal force of the holder 10 and the like is small, and an end of the restriction flange 13 may move away from the first rail portions 6₁ by the small inclination moment applied from the inner roller 9 to the holder 10, causing a tendency of inclination of the holder 10. However, one end of the presser plate 14 is immediately brought into abutment against the second rail portions 6₂ to suppress further inclination of the holder 10, thus maintaining a proper rolling condition of the outer roller 12.

Further, also in the case that both the transmitting shafts 1 and 2 are axially displaced, the outer roller 12 is not inclined, but can be smoothly rolled on the opposite side surfaces of the transmitting groove 5.

As described above, there is formed a restriction flange integrally with the holder which flange abuts against the bottom surface of the transmitting groove and restricts inclination of the holder. With this arrangement, during rotation of the joint, the abutting condition of the restriction flange against the bottom surface of the transmitting groove is maintained by centrifugal force, thereby reliably preventing the inclination of the holder and always maintaining a proper rolling condition of the outer roller. Accordingly, a rolling resistance of the outer roller is reduced to thereby reduce power loss and also suppress the generation of vibration.

Figure 4:
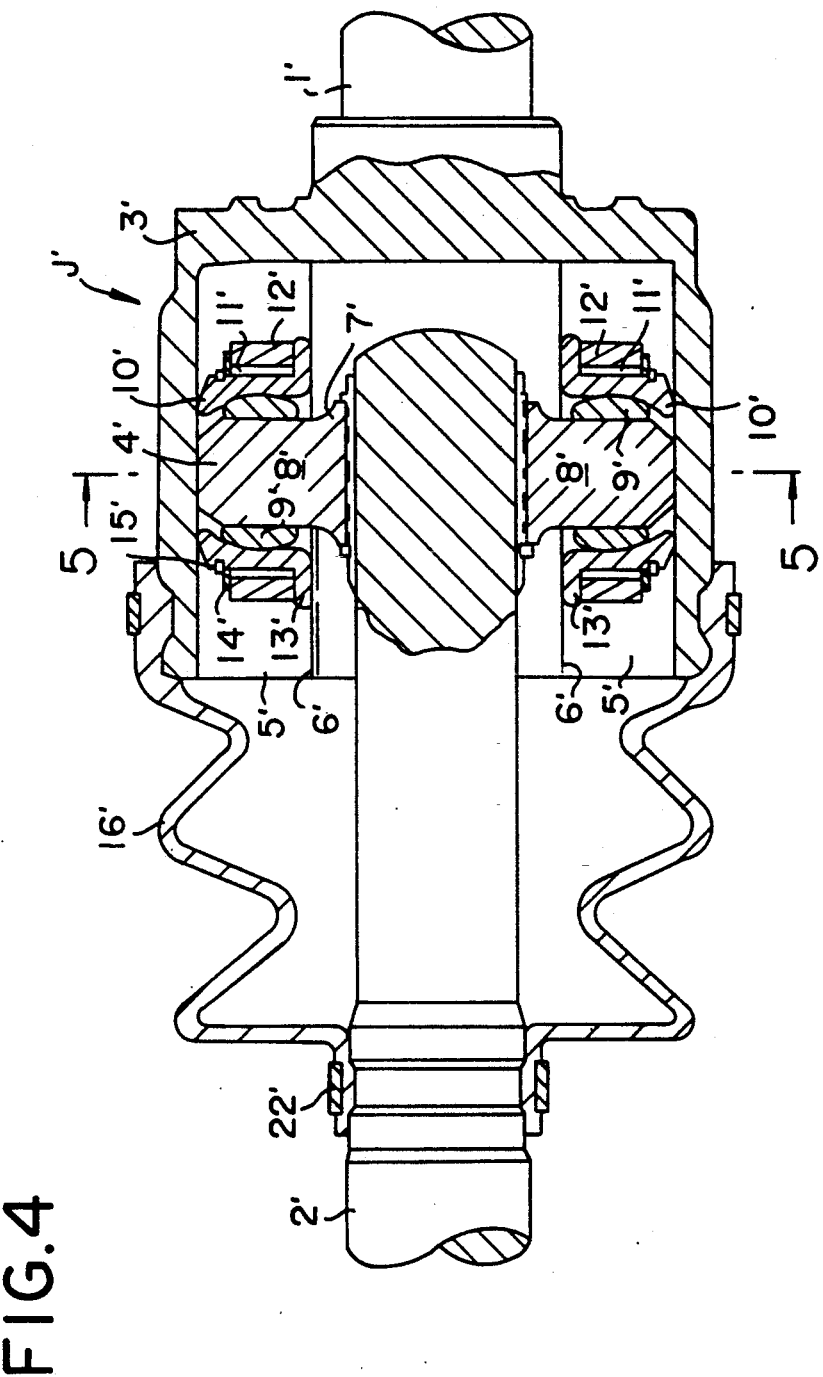
FIG. 4 is a vertical sectional view of the second preferred embodiment of the sliding universal joint according to the present invention.
Figure 5:
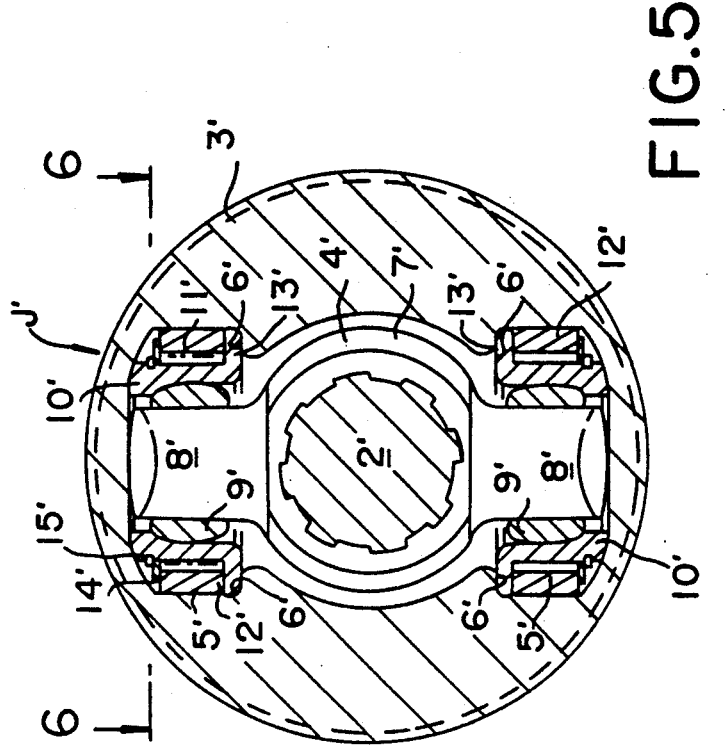
FIG. 5 is a cross-section taken along the line V—V in FIG. 4.

Referring next to FIGS. 4 and 5 which show a second preferred embodiment of the present invention, two transmitting shafts 1 and 2 are connected to each other through a bipod type universal joint J' of the present invention. The joint J' primarily comprises a cylindrical outer member 3' integrally formed with an end portion of the transmitting shaft 1 which outer member 3' is open at one end thereof, and an inner member 4' fixed to an end portion of the transmitting shaft 2' and received in the outer member 3'. The outer member 3' is formed on its inner peripheral surface with two axially extending transmitting grooves 5' diametrically opposed to each other. Each groove 5' is provided with a pair of rail portions 6' inwardly projecting from opposite inner side edges of the groove 5' toward an opening of the groove 5'.

The inner member 4' fixed to the transmitting shaft 2' is formed with a boss 7'. The boss 7' is integrally formed on its outer peripheral surface with two trunnions 8' projecting into the two transmitting grooves 5'.

A spherical inner roller 9' is slidably engaged with an outer periphery of each trunnion 8' in such a manner that a center of the inner roller 9' lies on an axis of the trunnion 8'. A holder 10' is relatively oscillatably engaged with the spherical outer periphery of the inner roller 9'. A cylindrical outer roller 12' is rotatably supported through a needle bearing 11' on the outer periphery of the holder 10', and is rollingly engaged with the inner surface of the transmitting groove 5'.

To suppress inclination of the holder 10' in the transmitting groove 5', an outer end of the holder 10' slidably abuts against the bottom surface of the transmitting groove 5', and the holder 10' is integrally formed at its inner end with a restriction flange 13' slidably abutting against the rail portion 6'. Thus, the rail portions 6' and the restriction flange 13 constitute the restriction means of the present invention.

Figure 6:
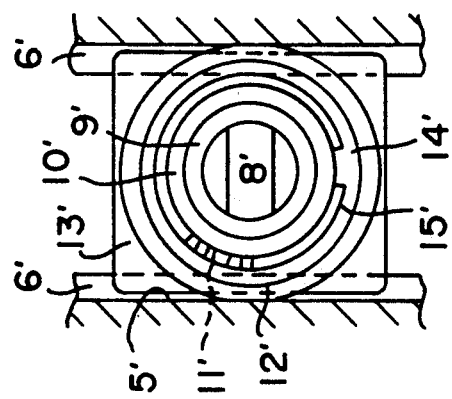
FIG. 6 is a cross-section taken along the line VI—VI in FIG. 5.

As shown in FIG. 6, the restriction flange 13' is formed in a rectangular shape such that at least its one side extending across the width of the transmitting groove 5' is slightly smaller than an outer diameter of the outer roller 12', so as not to hinder the rolling motion of the outer roller 12'.

Further, a presser plate 14' is mounted on the holder 10' by a circlip 15'. The presser plate 14' cooperates with the restriction flange 13' to restrict axial movement of the outer roller 12'.

As shown in FIG. 4, a flexible boot 16' is provided between the outer member 3' and the transmitting shaft 2' to cover the front opening of the outer member 4'.

In operation, when torque is applied to the transmitting shaft 1', for example, the torque is transmitted from the outer member 3' to the inner member 4', that is, from one side surface of the transmitting groove 5' through the outer roller 12', the holder 10' and the inner roller 9' to the trunnion 8' and the boss 7', and is finally transmitted to the transmitting shaft 2'.

During such transmission of the torque, when the transmitting shafts 1' and 2' are bent relative to each other in a plane including the axes of the transmitting shafts 1' and 2' and perpendicular to the axis of the trunnions 8', the outer rollers 9 are rotated relative to the trunnions 8'.

On the other hand, when the transmitting shafts 1' and 2' are bent relative to each other in a plane including the axes of the transmitting shafts 1' and 2' and also including the axes of the trunnions 8, the inner roller 9' is oscillated in the holder 10' in such a manner as to permit the inclination of the trunnion 8', and simultaneously slides on the trunnion 8', while the outer roller 12' is reciprocatingly rolled on one side surface of the transmitting groove 5'. At this time, the restriction flange 13 is in abutment against the rail portion 6' to restrict the inclination of the holder 10' in the transmitting groove 5'. Accordingly, the outer roller 12' supported on the holder 10' is always hindered from being inclined, thereby allowing the outer roller 12' to smoothly roll on the opposite side surfaces of the transmitting groove 5.

Further, also in the case that both transmitting shafts 1' and 2' are axially displaced, the outer roller 12' is not inclined, but can be smoothly rolled on the opposite side surfaces of the transmitting groove 5'.

As described above, there is provided in a sliding universal joint including an inner roller slidably engaged with an outer periphery of each trunnion, a holder relatively oscillatably engaged with an outer periphery of the inner roller, an outer roller engaged with an outer periphery of the holder and adapted to be rolled on side surfaces of the transmitting groove, the improvement of a restriction means provided between the outer member and the holder for restricting inclination of the holder. With this arrangement, even when the trunnion is inclined, the inclination of the holder is restricted by the restriction means to thereby always maintain a proper rolling condition of the outer roller and allow a smooth reciprocating motion thereof in the transmitting groove. Accordingly, sliding friction of the outer roller may be substantially nullified, and a power loss and vibration due to the sliding friction may be prevented.

It is readily apparent that the above-described meets all of the objects mentioned above and also has the advantage of wide commercial utility. It should be understood that the specific form of the invention hereinabove described is intended to be representative only as certain modifications within the scope of these teachings will be apparent to those skilled in the art.

Accordingly, reference should be made to the following claims in determining the full scope of the invention.

What is claimed is:

1. A sliding universal joint, comprising: a cylindrical outer member connected to at least one transmitting shaft and having an axis and an inner periphery formed with a plurality of transmitting grooves circumferentially arranged in equal spacing from each other and extending axially; an inner member connected to another transmitting shaft and having a plurality of trunnions radially extending to project into said transmitting grooves; an inner roller slidably engaged with an outer periphery of each trunnion; a holder oscillatably engaging with an outer periphery of each said inner roller; an outer roller having an outer diameter, said outer roller having an outer periphery rotatably engaging with an outer periphery of each said holder and engaging with each transmitting groove, each transmitting groove having a first rail portion and a second rail portion, said first rail portion being closer to said outer periphery of said outer member than said second rail portion; and a restriction flange having an inner side which extends along a longitudinal direction of said transmitting grooves and an outer side which extends along a transverse direction of said transmitting grooves, wherein said restriction flange is integrally formed with each said holder, wherein said inner side of said restriction flange is slightly smaller than said outer diameter of said outer roller and said outer side of said restriction flange is greater than said outer diameter of said outer roller, wherein said restriction flange abuts against said first rail portion of said transmitting groove of said cylindrical member inner periphery and restricts inclination of said holder relative to said axis of the outer member.

2. The sliding universal joint as defined in claim 1, wherein said restriction flange is rectangular such that opposite two sides of said flange are parallel to a longitudinal direction of said transmitting groove.

3. A sliding universal joint, comprising a cylindrical outer member connected to one transmitting shaft and having an axis and an inner periphery formed with two transmitting grooves diametrically opposed to each other and extending axially, each of said transmitting grooves having a first rail portion and a second rail portion, said first rail portion being closer to said outer periphery of said outer member than said second rail portion; an inner member connected to another transmitting shaft and having a boss formed at its outer periphery with two trunnions transmittably projecting into said two transmitting grooves; an inner roller slidably engaged with an outer periphery of each trunnion; a holder relatively oscillatably engaged with an outer periphery of each said inner roller; an outer roller engaged with an outer periphery of each said holder and adapted to roll on side surfaces of said transmitting groove; and a restriction means provided between said outer member and said holder for abutting against said first portion of one of said transmitting grooves of said cylindrical member inner periphery and for restricting inclination of said holder relative to said axis of the outer member.

* * * * *